United States Patent [19]

Remsburg

[11] Patent Number: 4,815,495
[45] Date of Patent: Mar. 28, 1989

[54] QUICK DISCONNECT HAVING REDUCED FLUID PRESSURE DROP

[75] Inventor: Ralph Remsburg, Santa Ana, Calif.

[73] Assignee: Preece Incorporated, Irvine, Calif.

[21] Appl. No.: 38,042

[22] Filed: Apr. 14, 1987

Related U.S. Application Data

[63] Continuation-in-part of Ser. No. 850,041, Apr. 10, 1986, abandoned.

[51] Int. Cl.$^4$ .............................................. F16L 37/28
[52] U.S. Cl. .............................. 137/614.03; 137/614; 137/808; 251/126
[58] Field of Search ................... 137/614.03, 614.04, 137/808; 251/356, 126

[56] References Cited

U.S. PATENT DOCUMENTS

| | | | |
|---|---|---|---|
| 2,649,273 | 8/1953 | Honegger | 251/126 |
| 3,469,591 | 9/1969 | Odendahl | 251/126 |
| 4,219,048 | 8/1980 | Ekman | 137/614.04 |
| 4,269,389 | 5/1981 | Ekman | 137/614.04 |
| 4,289,164 | 9/1981 | Ekman | 137/614.03 |
| 4,495,965 | 1/1985 | Ise | 251/126 |
| 4,586,537 | 5/1986 | Takahashi | 137/614.04 |

FOREIGN PATENT DOCUMENTS 555692  9/1943  United Kingdom ........... 137/614.03

Primary Examiner—A. Michael Chambers
Attorney, Agent, or Firm—Leonard Tachner

[57] ABSTRACT

An improved quick disconnect apparatus comprising a nipple and coupler and having significantly improved Cv or flow characteristics resulting surprisingly from certain specified design ranges of flow path areas in relation to the flow path area at the interior of the input to the quick disconnect, the interconnecting angles, and a high degree of dimensional match between components. The principal structural changes relative to the prior art are provided in the coupler stem and its relation with the components enveloping it. The invention provides a reduction in flow pressure drop of as much as 30 percent or more over the prior art for comparable size quick disconnects.

2 Claims, 6 Drawing Sheets 4,815,495

QUICK DISCONNECT HAVING REDUCED FLUID PRESSURE DROP

CROSS-REFERENCE TO RELATED APPLICATIONS

This application is a continuation-in-part of Patent Application Ser. No. 850,041 filed Apr. 10, 1986, now abandoned.

BACKGROUND OF THE INVENTION

1. Field of the Invention

The present invention relates generally to certain improvements in quick disconnects and more specifically, to certain improvements in the geometrical parameters of quick disconnects which produce surprising results, namely, unexpected significant reduction in fluid pressure drop across teh quick disconnect.

2. Prior Art

Quick disconnects are well-known in the art. They are commonly used to interconnect one flexible pipe to another flexible pipe, both of which pipes are adapted for the flow of a fluid therethrough. The term "pipe" as used herein means any type of fitting, hose, boss, etc., to which a quick disconnect may be attached. The term "quick disconnect" is derived from the performance characteristics of this type of connector. More specifically, a quick disconnect is adapted to permit disconnection of the two fluid carrying pipes with a self-sealing feature designed so that little or no quantities of the fluid escape the connectors upon disconnection. Furthermore, the process of disconnecting the two pipes can be implemented by simple mechanical release of a portion of the body of the quick disconnect without the necessity for disconnecting or unfastening a plurality of conventional fastening elements such as bolts and the like. Some self-sealing quick disconnects may require the use of a wrench.

Although it can be readily understood that such a quick disconnect apparatus is highly advantageous for the aforementioned purpose, one disadvantage is that inherently the placement of virtually any kind of connector in the path of fluid flow that restricts the flow path causes an undesirable pressure drop. In most cases there has been a trade-off between the extent of such an undesirable pressure drop and the size of the quick disconnect apparatus. More specifically, those having skill in the art to which the present invention pertains generally believe that the larger the quick disconnect apparatus, the smaller is the pressure drop thereby reducing the disadvantages of such quick disconnect apparatus from the standpoint of pressure drop. This has been disproven by the research relating to the present invention. The larger quick disconnect theory is accurate up to approximately 2.5 times the pipe flow area. If the area grows larger than this, the pressure drop will actually increase. This is due to two different actions. If a quick disconnect is made so that it is to standard commercial length but larger in diameter, the interconnecting angles will be extreme, causing fluid separation, and velocity deceleration upon diverging, and excessive boundary layer friction upon converging. This results in high pressure loss. Conversely, if a quick disconnect is made so that it is standard in diameter but very long, the resulting boundary layer friction (even while diverging) will increase the pressure drop. The reason that the larger quick disconnect theory has persisted is because the pressure drop resulting from an oversize quick disconnect is not nearly as great as the pressure drop of a small quick disconnect not using the novel geometric principals disclosed herein. An increase in the size of the quick disconnect apparatus results in at least a commensurate increase in the costs thereof which is also a significant disadvantage. In the aerospace industry in which this invention finds particularly advantageous application, weight is a concern equal to or greater than cost. Accordingly, there has been a long-felt need for a quick disconnect apparatus of the type having improved pressure drop characteristics so that either the pressure drop through a specific size quick disconnect can be reduced or for a specified pressure drop across the quick disconnect apparatus, the size of the quick disconnect can be reduced.

Virtually all quick disconnects comprise two major members called a "coupler" and "nipple", respectively. Each such member is designed to mate with a corresponding fluid carrying pipe and then to be mated with each other so that the respective pipes can be interconnected. The nipple may be regarded as the male member in that it slides into the coupler. Typically, the nipple comprises a spring loaded poppet and the coupler comprises a stationary stem. When the coupler and nipple are mated, the coupler stem is designed to engage the nipple poppet, pushing it away from the interface of the two members whereby to permit fluid flow around the poppet of the nipple as will be hereinafter more fully described. In addition, when the two members are interconnected, the nipple body slides into the coupler body so as to depress a spring loaded cylinder called the coupler poppet, the depression of which allows fluid flow through the coupler as well. This generalized description of the major components of typical quick disconnect apparatus is provided herein primarily for purposes of background. The specific structural details of the quick disconnect of the present invention as well as the advantageous improvements thereto will be provided hereinafter.

SUMMARY OF THE INVENTION

The present invention solves the aforementioned long-felt need for a quick disconnect apparatus having reduced fluid flow pressure drop for a specified size of connector members. The present invention accomplishes the aforementioned result by providing an improved quick disconnect with certain geometrical modifications to conventional quick disconnects which modifications produce surprising and unexpected results in the form of at least 30 percent reduction in pressure drop for a given size quick disconnect apparatus. These modifications reside primarily in certain interconnecting structural angles and selected ratios of cross sectional flow area along the coupling stem and flow cone areas around the stem. More specifically, the following flow areas have been defined: The flow areas adjacent the inner surface of the stem, the stem flow channel, the stem neck or shaft, and the contact surface. It has been found that by specifying that the ratio of the flow area adjacent the stem inner surface to the flow area adjacent the stem flow channels to be within the range of 0.87 to 0.57, the ratio of the area adjacent the stem flow channels stem to the area adjacent the stem shaft to be within the range of 0.87 to 0.715, the ratio of the area adjacent the stem shaft to the nipple adjacent the control surface to be within the range of 0.715 to 0.5, the ratio of the area adjacent the stem inner surface to the area adjacent the stem shaft to be within the range of 0.834 to 0.454 and the ratio of the area adjacent the stem inner surface to the area at said contact surface to be within the range of 0.526 to 0.232, yields at least a 30 percent reduction in pressure drop. Another important aspect of the invention relates to maintaining close tolerances for matching flow diameters.

The specific description of these areas and the geometrical changes to the quick disconnect elements which are incorporated in these area specifications will be more fully understood hereinafter as a result of a detailed description of a preferred embodiment of the invention.

OBJECTS OF THE INVENTION

It is therefore a principal object of the present invention to provide an improved quick disconnect apparatus with certain novel geometrical modifications which provide surprising and highly advantageous results primarily in the form of a reduced pressure drop for a given size quick disconnect.

It is an additional object of the present invention to provide a quick disconnect apparatus for interconnecting pipes carrying fluid wherein the size of the quick disconnect members for a given pressure drop in the fluid carrying line may be reduced as compared to a conventional quick disconnect apparatus.

It is still an additional object of the present invention to provide a quick disconnect apparatus of the type hereinabove described having a male member commonly referred to as a nipple and a female member commonly referred to as a coupler wherein the coupler comprises a stem of unique configuration in which the flow areas adjacent the stem at selected locations are selected to fall within certain preselected ranges of ratios which yield surprising and highly advantageous results in the form of a significant reduction in the pressure drop through the quick disconnect apparatus for a given size quick disconnect.

BRIEF DESCRIPTION OF THE DRAWINGS

The aforementioned objects and advantages of the present invention as well as additional objects and advantages thereof will be more fully understood hereinafter as a result of a detailed description of a preferred embodiment of the invention when taken in conjunction with the following drawings in which.

DETAILED DESCRIPTION OF A PREFERRED EMBODIMENT

Referring simultaneously to FIGS. 1, 2, 3 and 4 it will be seen that the quick disconnect 10 of the present invention comprises a nipple member 12 and a coupler member 14 each of which is adapted to connect to one of two interconnectible pipe for controlling the flow of fluids therebetween whereby the fluid may flow when the nipple and coupler members are interconnected and the fluid is prevented from flowing when the nipple and coupler members are disconnected from one another.

Figure 1:
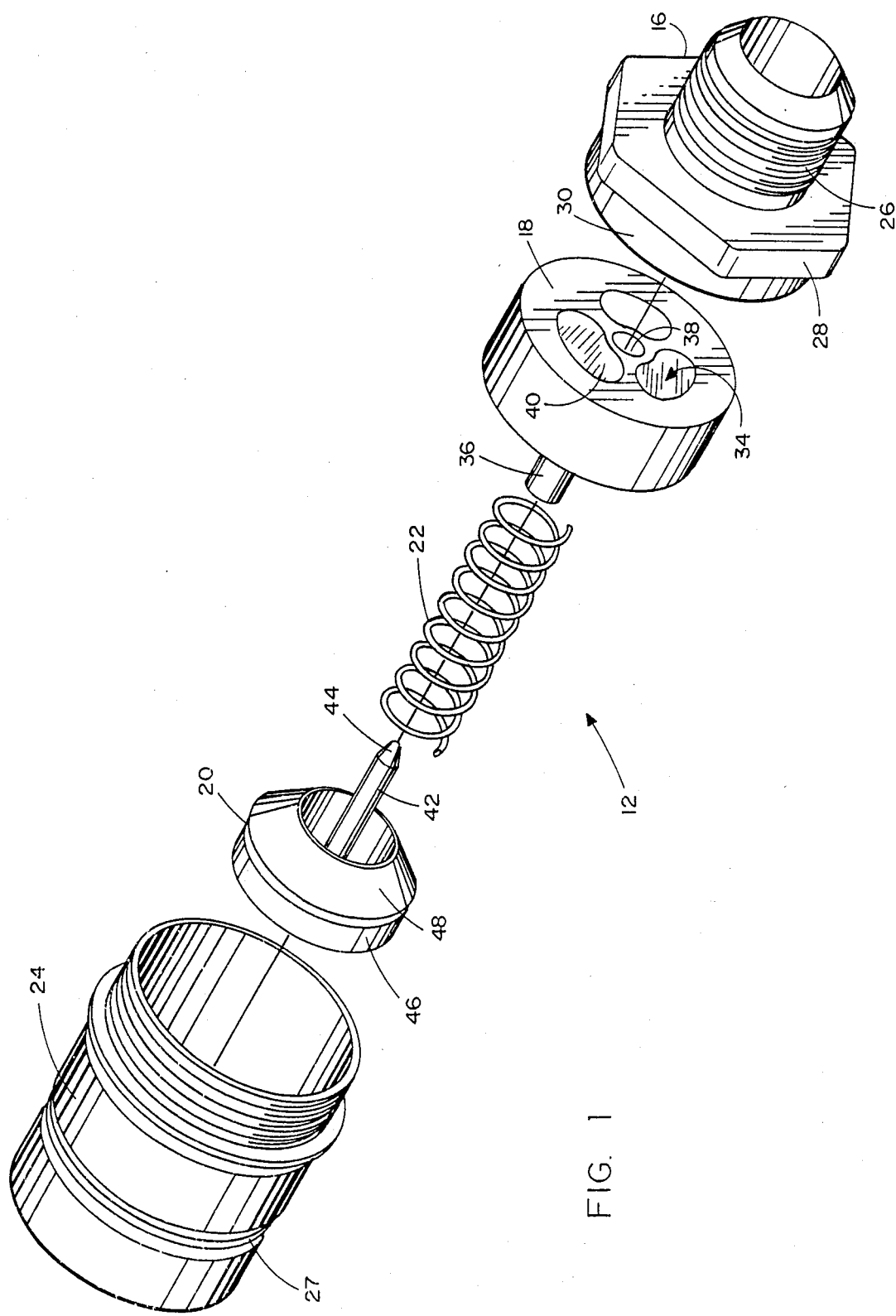
FIG. 1 is an exploded isometric view of the nipple member of a first embodiment of the present invention.

As seen best in FIG. 1, the nipple member 12 comprises a base 16, a guide 18, a poppet 20, a spring 22 and a body 24. Base 16 comprises a threaded member 26 which is adapted to interconnect to a corresponding threaded member (not shown) in the interconnecting pipe (not shown) in a conventional manner. Other embodiments of base member 16 may use different end fitting configurations which may be press-fit, brazed, welded or swaged. Base 16 further provides a hex flange 28 which is provided to permit the application of a high torque to the base 16 for assembling the nipple member 12 and for attaching the nipple to a fitting. Hex flange 28 is made integral to a base flange 30 which is adapted to receive the guide 18. Guide 18 is provided with a plurality of expansion channels 34 and a centrally located poppet guide tube 36 which terminates in a poppet guide slot 38 seen best in the lower right hand corner of FIG. 1.

The interior of the expansion channels 34 comprise channel surfaces 40, the surface area of which increases from the base side of guide 18 to the spring side of guide 18 to provide a smooth flow expansion characteristic to the fluid flowing from the threaded member 26 through the guide 18. The poppet guide tube 36 and poppet guide slot 38 located along the axis of guide 18, are adapted to receive a poppet rod 42 of poppet 20.

Poppet rod 42 terminates in a tapered tip 44 and the length of the rod 42 is selected whereby the tapered tip 44 extends beyond the poppet guide slot 38 exiting at the base side of guide 18. There is thus provided a smooth surface transition between the channel surfaces 40 of expansion channels 34 in that tapered tip 44 acts as a diffuser to aid in channeling the fluid into the plurality of expansion channels 34.

Spring 22 is designed to be compressed between the poppet 20 and the guide 18 and is situated exterior to and aligned with poppet guide tube 36 at one end and the poppet rod 42 at the other. Spring 22 cannot affect flow because it is outside of the flow stream. Poppet 20 also comprises an interfacing member 46 which is provided with a substantially cylindrical portion 47 and a conical flow guide surface 48. The face of the interfacing member 46 is a contact surface 49 which is adapted to come in aligned contact with corresponding face of the stem 64 of the coupler 14 which will be described hereinafter in more detail.

The flow guide surface 48 is provided with a cylindrical recess 51 which is adapted to receive one end of spring 22 for compressive engagement therewith whereby poppet 20 is adapted for axial motion relative to the guide 18 in response to force applied to contact surface 49 sufficient to overcome the compressive spring resistance of spring 22.

The interior peripheral surface of base flange 30 of base 16 is threaded and is adapted to make threaded connection to a threaded member 25 of body 24 when all of the individual components of nipple 12 are interconnected in the manner illustrated in FIG. 1. The end of body 24 opposite the threaded portion 25 is provided with an aperture, the diameter of which is slightly smaller than the diameter of the contact surface 49 of poppet 20. Consequently, when the nipple 12 is disconnected from the coupler 14 and as a result there is nothing forcing the poppet 20 towards the guide 18, the spring 22 is fully extended until the contact surface 49 of poppet 20 rests at the end of body 24 opposite the threaded member 25.

It will be understood that the poppet 20 is responsive to a force applied to contact surface 49 in a direction along the axis of the flow path through the nipple 12 to compress the spring 22 and force poppet rod 42 further into poppet guide tube 36 and poppet guide slot 38 thereby recessing the poppet 20 from the end of body 24 opposite threaded member 25. Fluid may then flow through the base 16 through the expansion channels 34 of guide 18 around the flow guide surface 48 of poppet 20 and through the body 24 with the nipple 12 in the configuration represented in FIG. 4.

Figure 2:
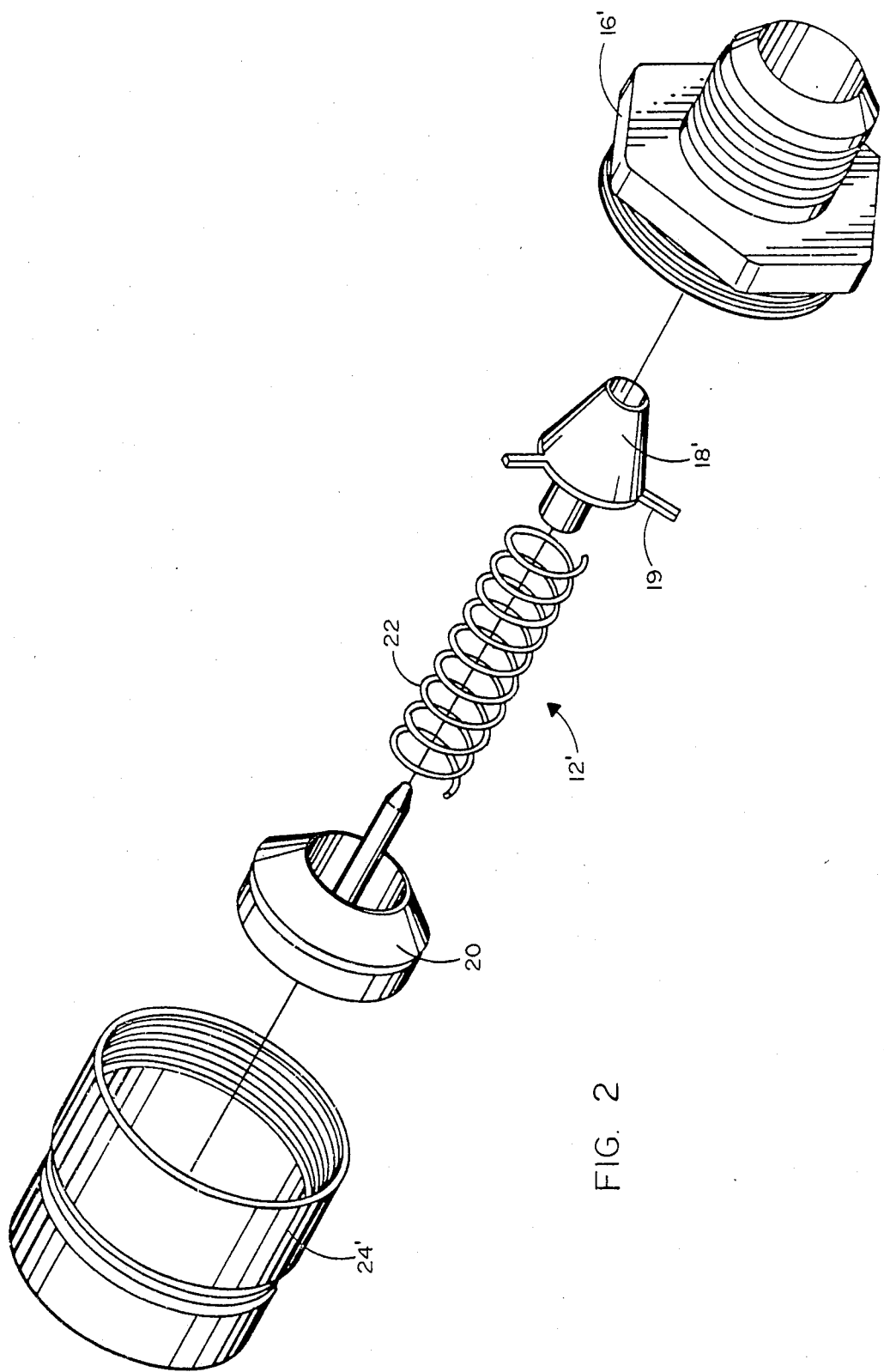
FIG. 2 is an exploded isometric view of the nipple member of a second embodiment of the invention.

A second, somewhat simplified, embodiment of a nipple member 12' suitable for use in the present invention is illustrated in FIG. 2. Nipple member 12' illustrates alternate designs for body 24' and base 16' wherein the base flange 30 of FIG. 1 is no longer a smooth flange, but is instead provided as an externally threaded connection for the internally threaded nipple body 24'. The interior of base 16' is provided with a rounded interior surface which serves the function of the outer wall of the more complex guide 18 of FIG. 1, thereby permitting a significant simplification of the guide in the form of guide 18'. Guide 18' is held in place within base 16' by a small land which acts as a stop for projections 19.

Figure 3:
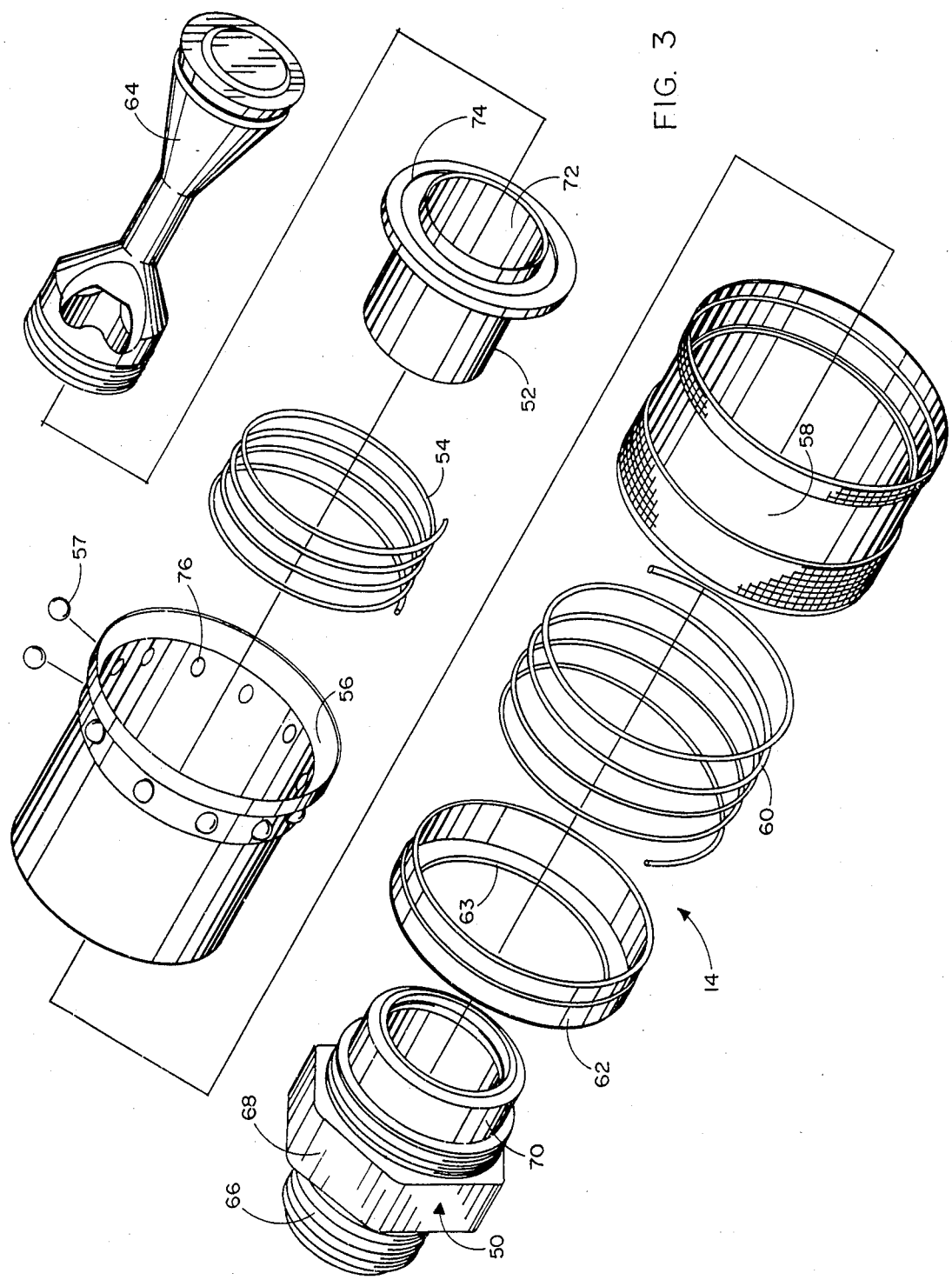
FIG. 3 is an exploded isometric view of the coupler member of the present invention.

As seen best in FIG. 3, coupler 14 comprises a base 50, a poppet 52, an inner spring 54, a ball cage body 56, an outer sleeve 58, an outer spring 60, a spring retainer 62 and a stem 64. Base 50 comprises a threaded member 66 which has the same function as threaded member 26 of base 16 of nipple 12. More specifically, threaded member 66 is adapted to connect to the other one of two pipes which the respective members 12 and 14 of the quick disconnect 10 are adapted to interconnect.

Base 50 is also provided with a hex flange 68 which serves a purpose similar to the hex flange 28 of base 16 of nipple 12, namely, to permit wrench tightening of the coupler assembly. Base 50 is also provided with a body interface 70, a portion of which is threaded for connection to ball cage body 56 and the inner portion of which is threaded for connection to a corresponding threaded member 80 of stem 64 which will be described in detail hereinafter.

Body interface 70 of base 50 is generally cylindrical and is adapted to be received by the spring retainer 62 through an aperture defined by an annular flange 63 which is designed to rest against the hex flange 68. The annular flange 63 is adapted to receive one end of the outer spring 60, the other end of which is adapted to be received by the outer sleeve 58 whereby the outer sleeve 58 may be compressed towards the base 50 against the compression resistance of spring 60.

Figure 4:
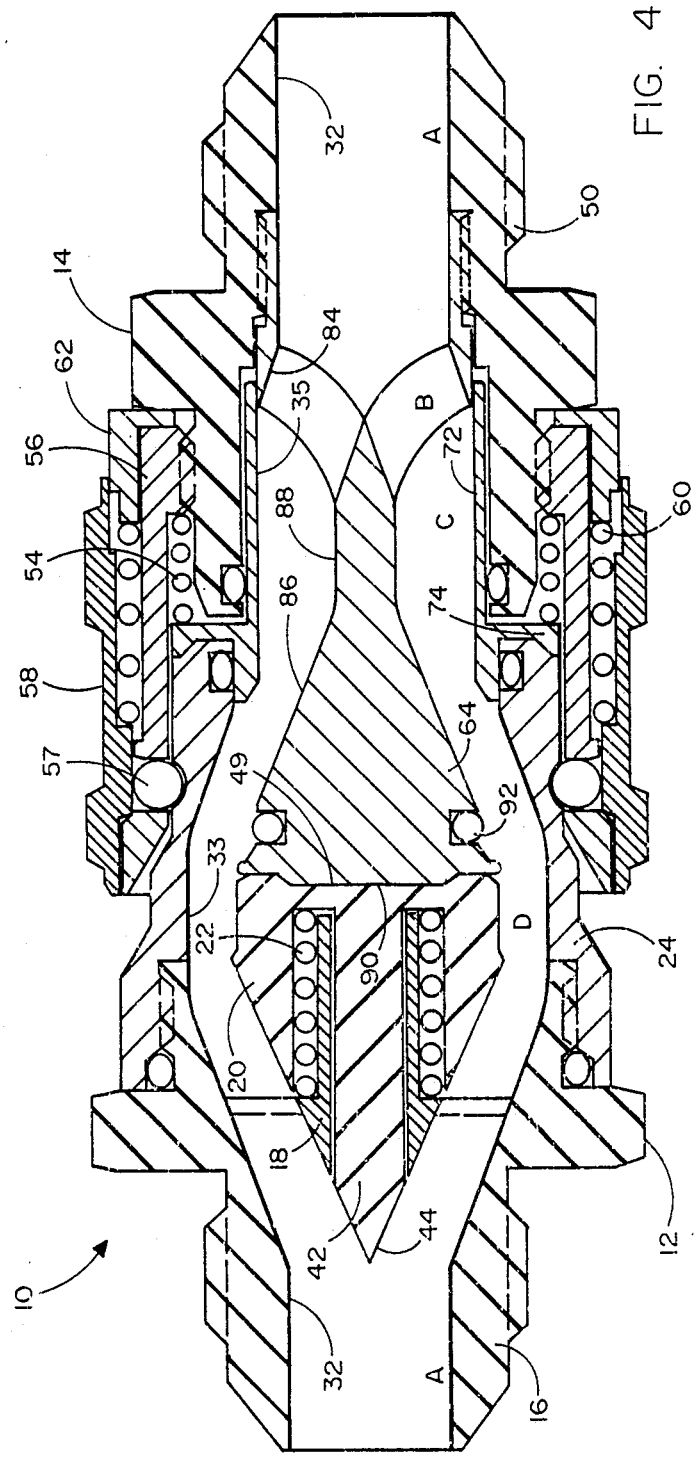
FIG. 4 is a cross-sectional plan view of the quick disconnect apparatus of the present invention shown in its fully assembled and interconnected configuration.

Outer sleeve 58 is of a cylindrical shape and is adapted to receive the ball cage body 56 for slideable overlapping engagement therewith as seen best in FIG. 4. Thus, outer sleeve 58 may be moved axially relative to the ball cage body 56 whereby to permit a plurality of ball bearings 57 carried in a like plurality of ball retaining holes 76, to move radially relative to the ball cage body 56.

As seen in FIG. 4, when the nipple and coupler 12 and 14, respectively, are interconnected for permitting fluid flow through the members of the quick disconnect 10, the body 24 of nipple 12 is received concentrically within the interior of ball cage body 56 whereby the ball bearings 57 may reside in an annular groove 27 along the exterior surface of body 24. With the outer sleeve 58 in the position shown in FIG. 4 relative to the ball bearings 57, the ball bearings are secured within the groove 27 thereby securing the nipple 12 and coupler 14. However, when the outer sleeve 58 is moved axially away from the nipple and toward the coupler, that is, toward the base 50 of the coupler, the portion of the outer sleeve 58 immediately adjacent the ball bearings 57 is of a greater inside diameter thereby allowing the ball bearings to be released from the groove 27 of the body 24. As a result, the spring tension applied by the compressed springs 54 and 22 when the members 12 and 14 are interconnected, forces the release of the nipple 12 from the coupler 14. Spring 60 forces the outer sleeve 58 back to lock ball bearings 76 in ball groove 27 of body 24.

The inner spring 54 resides within the ball cage body 56 and is adapted to receive the poppet 52. As seen best in FIG. 3, the poppet 52 comprises a substantially cylindrical body 72 integral to an annular flange 74 which may be denoted as the nipple body interface flange 74. The flange 74 is adapted to compress one end of inner spring 54, the other end of which is received within the ball cage body 56 in the manner illustrated in cross-section in FIG. 3. The interior surface of cylindrical body 72 of coupler poppet 522 is adapted to coaxially surround the stem 64 at a relative position which depends upon whether the coupler 14 is connected to nipple 12 or disconnected therefrom.

More specifically, when the coupler 14 is disconnected from the nipple 12 and no force is applied to flange 74 of poppet 52, inner spring 54 is extended whereby to force the poppet 52 toward the contact surface 90 of stem 64. In this configuration, the inner surface of cylinder 72 comes into concentric engagement with the stem 64 adjacent the O-ring 92 seen best in FIG. 6. As a result, the flange 74 fills what would otherwise be a flow channel or gap between stem 64 and ball cage body 56 whereby to prevent flow around stem 64.

On the other hand, when the nipple 12 and coupler 14 are interconnected as seen in FIG. 4 in cross-section, the body 24 forces the flange 74 and therefore the poppet 52 in its entirety to be compressed against the inner spring 54 and towards the base 50. As a result, the portion of cylinder 72 farthest from the flange 74 comes to rest adjacent and exterior to the cylinder 82 at the flow channels 84 of stem 64 seen best in FIG. 6. In this configuration the fluid flow is permitted around the exterior surface of stem 64, the detailed geometry of which will be discussed hereinafter.

Figures 5, 6:
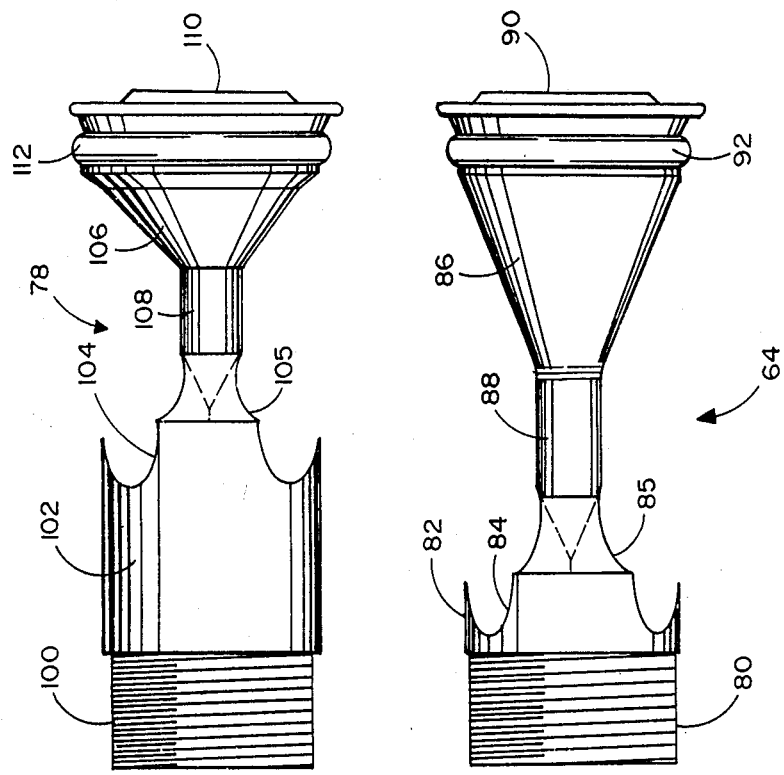
FIGS. 5 and 6 are plan views of a prior art stem and improved stem, respectively, of the type used in the coupler member of the present invention illustrating the novel improvements implemented in the present invention as compared to the prior art.

Reference will now be made to FIGS. 5 and 6 which illustrate a conventional stem of the prior art, namely, stem 78 of FIG. 4 and a novel stem of the present invention, namely, stem 64 of FIG. 6. Stem 78 comprises a threaded member 100, a cylinder 102, a pair of flow channels 104, a conical surface 106, a neck portion 108, a diverter portion 105, a contact surface 110 and an O-ring 112. Stem 64 of the present invention shown in FIG. 6 comprises analogous elements, namely, a threaded member 80, a cylinder 82, a pair of flow channels 84, a conical surface 86, a diverter member 85, a neck portion 88, a contact surface 90 and an O-ring 92.

The principal differences between the two stems 64 and 78 reside in the selection of certain geometrical modifications to achieve the flow channel area ratios previously mentioned and which produce the surprising and unexpected result of at least a 30 percent reduction in pressure drop through the quick disconnect apparatus 10 for a given size apparatus. More specifically, it is seen that the cylinder 82 has been significantly shortened compared to the cylinder 102 in compensation for which the neck member 88 and conical surface 86 of stem 64 have been lengthened as compared to the corresponding neck member 108 and conical surface 106 of the prior art stem 78 of FIG. 5.

In order to achieve this modification, the angle of the conical surface 86 with respect to the axis of the stem 64 has been significantly reduced from almost 40 degrees in the prior art stem of FIG. 5 to approximately 23 degrees in the improved stem of FIG. 6. In addition, the overall length of the cylindrical portion 82 has been reduced to less than 12 percent of the total length of the stem as compared to approximately 34 percent of the total length of the stem for the length of cylinder 102 of the prior art stem. Clearly, the position of flow channels 84 in cylinder 82 has also been drastically altered as compared to the flow channels 104 of cylinder 102 of prior art stem 78 by shortening the cylinder whereby to move the flow channels significantly closer to the threaded member 80 as compared to the position of flow channels 104 relative to threaded member 100 of the prior art stem. In the particular embodiment illustrated herein, the axis of the flow channels 84 have been milled 20 degrees to the vertical axis and canted approximately 5 degrees relative to the flow axis and opposite of each other in order to impart a centrifugal rotational force to the fluid.

The characteristics of the flow channel avalable to the fluid flow through the quick disconnect 10 when the nipple 12 and coupler 14 are interconnected is represented best in FIG. 4 wherein the previously described flow channel areas are appropriately designated by the letters A, B, C and D, respectively. The principal geometrical modifications of the elements of the quick disconnect 10 required to achieve the flow channel areas and the ratios of those respective areas to one another as defined hereinabove, are embodied primarily in the modification to the geometry to the stem 64 as decribed above in conjunction with FIGS. 5 and 6.

Figure 7:
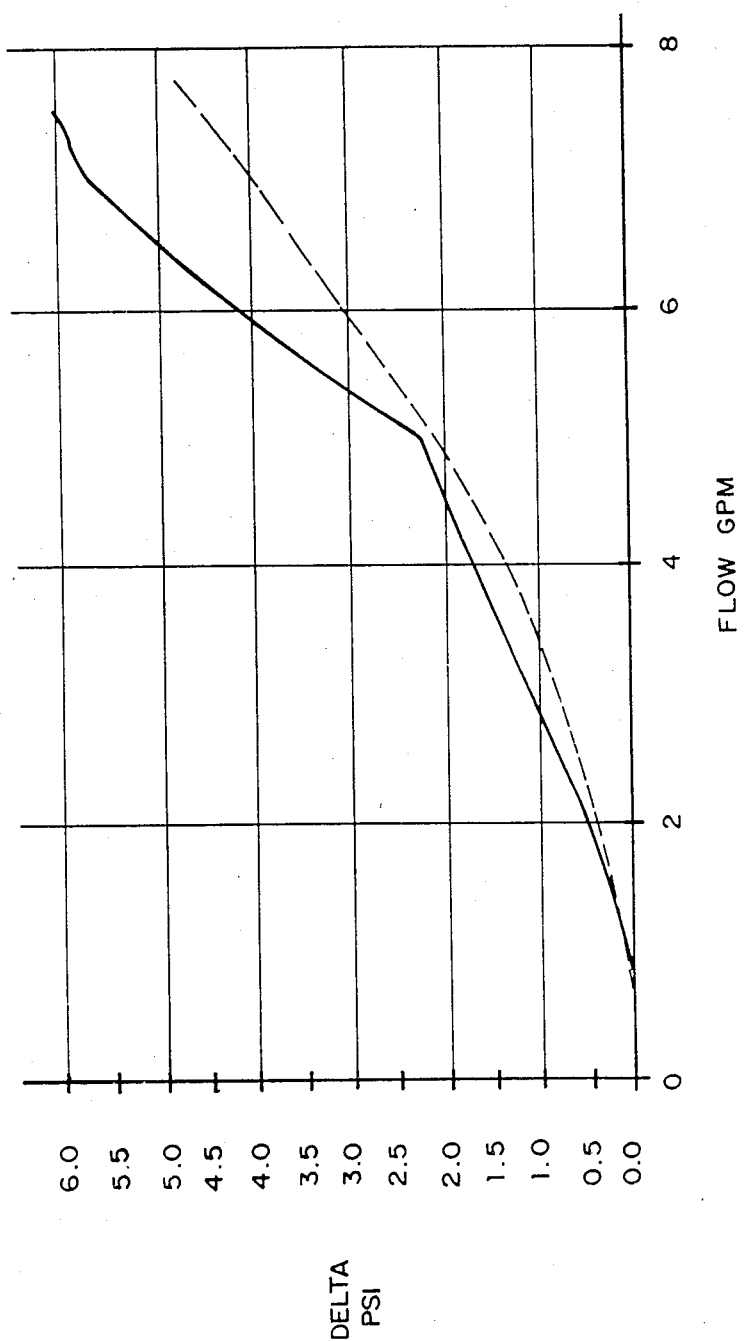
FIG. 7 is a graphical representation illustrating the advantageous flow characteristic of the present invention as compared to a conventional quick disconnect of equivalent size.

The surprising aspect of the aforementioned geometrical changes is that despite what appears to be a relatively simple alteration to the stem geometry to provide the aforementioned flow channel areas and area ratios, the resulting improvement in pressure loss reduction through the interconnected elements of the quick disconnect 10 is quite unexpected and extraordinary. FIG. 7 illustrates the improvement actually measured in a three-eighths size quick disconnect and compared with a prior art quick disconnect of equal size. The vertical axis represents pressure drop in pounds per square inch through each device and the horizontal axis represents flow through each device in gallons per minute. Thus, at a flow rate of 7 GPM, the pressure drop of the prior art device is about 5.7 psi. (solid line) and the pressure drop of the device embodying the invention is about 4.0 psi. (dashed line), an improvement of about 30%.

It will now be apparent that what has been disclosed herein comprises an improved quick disconnect of the type used for interconnecting a pair of pipes carrying fluid whereby disconnection of the respective pipes can be carried out rapidly and with little or no loss of fluid as a result of disconnecting the respective elements of the quick disconnect. More significantly, what has been disclosed herein is a quick disconnect having certain selected geometrical modifications as compared to the prior art. These modifications are embodied primarily in the geometry of the stem which is an element of the coupler member 14 of the quick disconnect 10 whereby to achieve certain specified flow channel areas and area ratios. By defining such ratios to be within selected ranges, one produces quite unexpected, surprising and highly advantageous results in the form of a significant reduction in pressure loss thereby achieving improved performance for a given size quick disconnect or achieving the same performance as compared to the prior art but while using a smaller size and therefore less costly quick disconnect.

Those having skill in the art to which the present invention pertains will, as a result of the applicant's teaching herein, perceive various alternative or additional modifications which may be made to the elements of a quick disconnect as herein disclosed. The applicant's specific means for achieving the improved flow characteristics by way of reduced pressure loss, are illustrated by way of example only in the specific embodiment disclosed herein. Accordingly, all such modifications which in fact provide the specific flow channel area ratios within the ranges herein specified are deemed to be within the scope of the invention which is to be limited only by the claims appended hereto.

I claim:

1. An improved quick disconnect apparatus of the type having a nipple and a coupler, the nipple having a depressible poppet for blocking flow through the nipple when the nipple and coupler are disconnected and for permitting flow through the nipple when the nipple and coupler are connected; the coupler having a stem for depressing the poppet of the nipple when the nipple and poppet are connected; the nipple and coupler forming a continuous flow path when the nipple and coupler are connected; the stem being defined by a hollow threaded member, a plurality of flow channels, a neck and a conical surface terminating in a poppet contact surface; the improvement comprising:

flow channels which are canted relative to a fow axis of said apparatus whereby to impart a rotational force to said flow; said flow channels discharging to an expanded flow area for exit from said apparatus; said continuous flow path being defined by a flow path wherein the ratio of the flow area at said threaded member to the flow area of said flow channels is within the range of 0.87 to 0.57; wherein the ratio of the flow area at said flow channels to the flow area at said neck is within the range of 0.87 to 0.715; wherein the ratio of the flow area at said neck to the flow area at said contact surface is within the range of 0.715 to 0.5; wherein the ratio of the flow area at said threaded member to the flow area at said neck is within the range of 0.834 to 0.454; and wherein the ratio of the flow area at said threaded member to the flow area at said contact surface is within the range of 0.526 to 0.232.

2. The improved apparatus recited in claim 1 wherein said conical surface of said stem is oriented at an angle of about 23 degrees relative to the flow axis of said apparatus.

* * * * *